United States Patent [19]

Ferrante

[11] Patent Number: 5,014,540

[45] Date of Patent: May 14, 1991

[54] JIG ASSEMBLY

[76] Inventor: Pat Ferrante, 3438 Old Lebanon Rd., Campbellsville, Ky. 42718

[21] Appl. No.: 500,372

[22] Filed: Mar. 28, 1990

[51] Int. Cl.$^5$ .................. B21J 13/03; B23G 9/00; B21K 1/44; B21K 1/56
[52] U.S. Cl. ............................................ 72/481; 10/9; 10/21; 72/470
[58] Field of Search .................. 10/4, 9, 21, 24, 35, 10/53, 59, 61, 70; 72/470, 476, 478, 481; 411/386, 387

[56] References Cited

U.S. PATENT DOCUMENTS

| | | | |
|---|---|---|---|
| 2,227,810 | 1/1941 | Mitchell | 10/24 |
| 3,241,353 | 3/1966 | Putetti | 72/481 |
| 3,398,413 | 8/1968 | Skierski | 10/9 |
| 3,407,642 | 10/1968 | Hall | 72/462 |
| 4,150,451 | 4/1979 | Skierski | 10/9 |
| 4,184,217 | 1/1980 | Dohl | 10/9 |

Primary Examiner—E. Michael Combs
Attorney, Agent, or Firm—Bauer & Schaffer

[57] ABSTRACT

An improved jig assembly for a die in the form of a supporting body member having a cavity receiving a die and wedge secured against vertical, back-and-forth and sideways movements with respect to the body member.

9 Claims, 1 Drawing Sheet

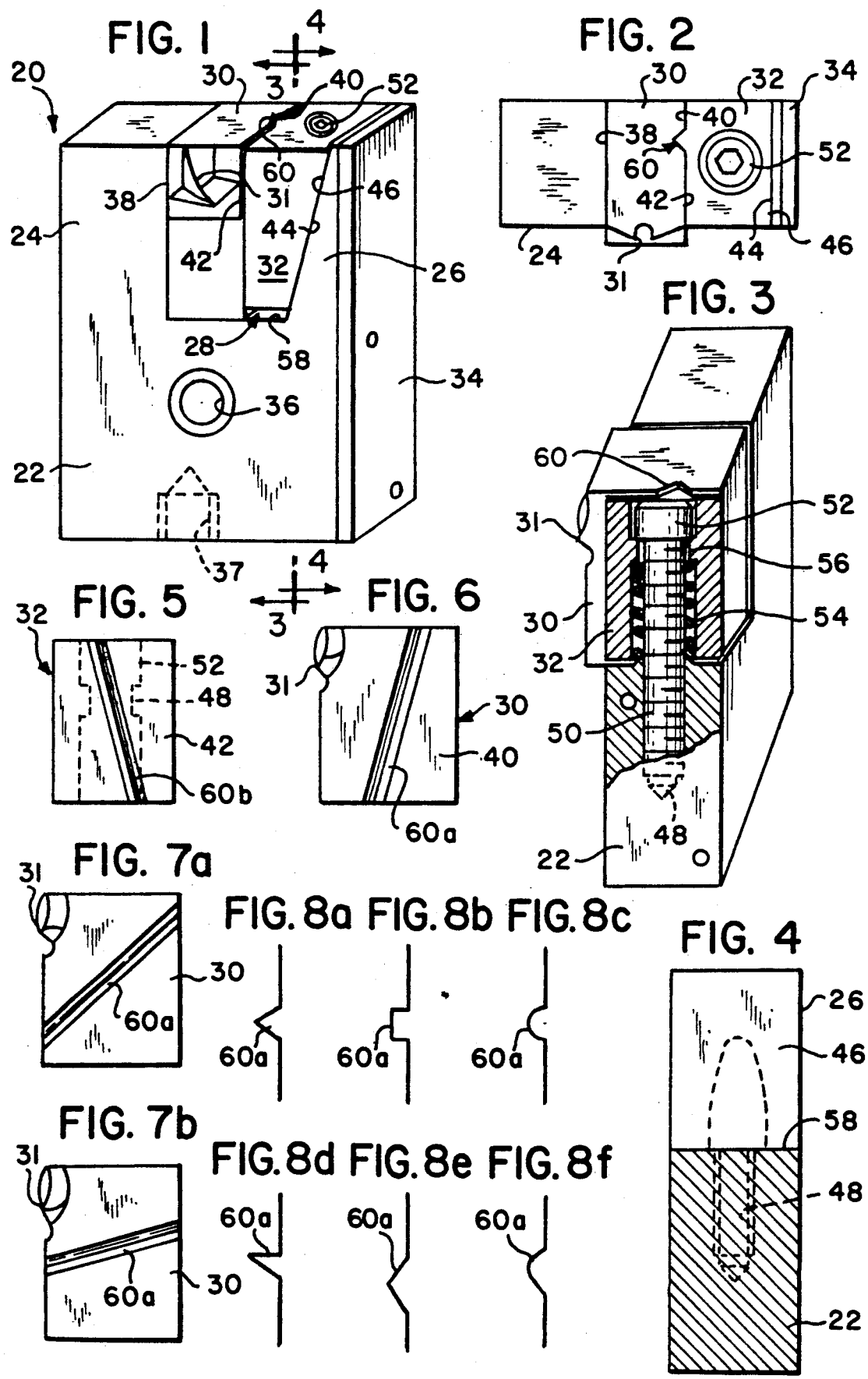

JIG ASSEMBLY

BACKGROUND OF THE INVENTION

The present invention relates to a jig and in particular to a holder for dies used in the drilling and threading of self-tapping screws.

Screws or fasteners having the capability of drilling a pilot hole and forming threads in a workpiece without the need to predrill are well known. Such screws and the dies by which they are made are illustrated in U.S. Pat. Nos. 3,395,603; 3,517,542; and 4,836,730. According to these patents a pair of dies are used to forge and drill the point into a desired configuration. Each of the dies is held in a jig comprising a solid parallelepiped body ground at its bottom to fit the die set pocket of the forming machine and is provided at its upper edge with a U-shaped cavity in one corner. The die is set up against one wall of the cavity, and a pair of wedges (one wide and one narrow) are inserted between the die and the other wall. The wedges are formed with mating inclined surfaces and with flat surfaces which abut up against the die and the face of the cavity wall, respectively. The abutting vertical surface of the die is formed with a laterally extending detent which fits within a conforming recess made in the abutting face of the narrow wedge. When the wedges are put in place the narrow wedge is arranged so that the horizontal projection fits within the recess of the die but is otherwise loose. The larger wedge is then placed in position and is screwed or bolted to the base. In this manner the wedges are secured tightly, one with the other, against the die, which prevents any vertical movement and ostensibly fixes the die in place.

The foregoing assembly does not, however, provide for security against movement of the die or even the locking wedges in a horizontal or sideways direction within the cavity. Such security, however, is necessary in order to maintain the die head extending from the base of the jig body to allow the screw blanks to be inserted for cutting. During high speed operation of the cutting apparatus, frequent downtime is required in order to reset the die wedges and the die to ensure for such security.

A further disadvantage of the known jig lies in the fact that it requires two wedges which have to be milled and ground to absolute tolerances to ensure the perfect fit. Another disadvantage lies in the fact that the jig is weakened by the need to thin the cavity walls in order to provide room for the two wedges.

It is, therefore, the object of the present invention to provide a holder for dies used in the formation of self-tapping screws which provide the necessary security against movement of the die and is more effective and has a longer life for use in the mass production of self-tapping screws. It is a further object of the present invention to provide a die which is simpler to manufacture, simpler to assemble, and which does not exhibit any of the above-mentioned disadvantages.

The foregoing objects and numerous advantages of the present invention will be apparent from the following disclosure.

SUMMARY OF THE INVENTION

In accordance with the invention there is provided an improved jig and holder assembly comprising a parallelepiped supporting body having a bottom and integrally upwardly extending sides defining an open cavity for receiving a parallepiped die and a die securing wedge. One of the side walls, against which the die abuts is disposed in a vertical plane while the other side wall is formed as an inwardly inclined ramp. The die holding wedge comprises a truncated trapazoidal body, having one side inclined conforming to the incline of the side wall of the body cavity and its opposite side at a right angle to the bases of the trapazoid. The die holding wedge is provided with a vertical bore extending therethrough which is in alignment with a vertical threaded bore of the body member and screw means are provided to extend in the vertical bores to secure the die holding wedge and the die in the cavity against each other. The abutting surfaces of the die and the die holding wedges are provided with at least one set of non-horizontally elongated extending detent and one non-horizontally extending mating recess.

The present invention provides an improved jig of fewer parts. A single die holding wedge squeezes the die against any vertical dislodgement and, because of the angular detent and groove, insures that the die will not shift frontwards or backwards in the cavity.

Full details of the present are set forth, in the following description of the preferred embodiments and the illustrations in the accompanying drawings.

BRIEF DESCRIPTION OF THE DRAWINGS

In the drawings:

FIG. 1 is a front perspective view of a jig according to the present invention, showing the die and die wedge in place;

FIG. 2 is a top plan view of the jig shown in FIG. 1;

FIG. 3 is a side view, partially in section, along line 3—3 of the jig in FIG. 1;

FIG. 4 is a sectional view taken along line 4—4 of FIG. 1, with the wedge and screw removed;

FIG. 5 is a side elevational view of the die holding wedge shown in FIG. 1, illustrating the nonhorizontal detents;

FIG. 6 is a side elevational view of the die shown in FIG. 1 illustrating the nonhorizontal recess which mates with the detent of the wedge shown in FIG. 5;

FIGS. 7a and 7b are elevational views of dies showing additional examples of the recess angle; and FIGS. 8a-8f are diagrammatic examples of the shapes the recess may have.

DESCRIPTION OF THE PREFERRED EMBODIMENTS

Referring now to FIG. 1 the jig assembly according to the invention comprises die supporting body member 20 having a bottom section 22 and upwardly extending side walls 24 and 26 defining an open cavity 28 receiving a die 30 and a die wedge 32. The die 30 is formed with parallelepiped body from one lateral edge of which extends the die head 31. The die is thus placed in the jig cavity so that its flat faces lie perpendicular to the front and rear faces of the jig as seen in FIGS. 2 and 3. The wedge 32 fits between the die 30 and the side wall 26 which tapers outwardly from the bottom of the cavity 28. A shim plate 34 is fixed to a side of the die body adjacent wedge 32 as shown in FIG. 1. The shim 34 is not critical but, if used, serves to strengthen the jig assembly and to provide room for fitting the jig body 20 into the die set pocket of the forming machine.

The jig body 20 is one piece formed of high-grade steel or similar metal. The bottom section is solid and, in the usual manner, shaped to fit into the set pocket of the forming machine. A horizontal bore hole 36 is provided in the center of the bottom section 22, permitting horizontal entry of a screw, bolt, or the like. Similarly, a threaded hole 37 is provided extending vertically upward from the bottom, also permitting entry of a screw or the like. In this manner, the jig can be securely fastened to the pocket in which it is seated.

The die 30 is conventional, being a solid block of metal having parallel faces, one face 38 of which is adapted to abut flat against the face of the vertical inner (unnumbered) wall of cavity 28 and an opposite face 40 against the wedge 32 as shown in FIG. 1. The wedge 32 is of trapazoidal shape, having one face 42 perpendicular to its bases and the opposite face 44 tapered at an angle to the base. The wedge 32 is inserted in the cavity 28 with its smaller base down so that its flat face 42 abuts against the flat face 40 of the die 30. The tapered face 44 of the die holding wedge 32 conforms to the ramp face 46 of the side wall 26, being inclined inwardly and downwardly so that the cavity 28 is smaller at its bottom than at its top, said cavity being defined by a bottom surface (unnumbered) extending between the vertical inner wall and ramp face or inclined inner wall 46 as clearly illustrated in FIG. 1.

A bore 48 extends vertically through the die holding wedge 32 and the inclined ramp face 46 of the side wall 26 into the bottom section 22. Since the bore 48 passes through inclined faces, it is only partially cylindrically closed as will be seen in FIG 4. The bore 48 in the bottom section 22 is threaded to receive a mating screw bolt 50 having a head 52 (FIG. 3). The bore 48 is countersunk at its top to receive the head 52 and, in its lower portion, is somewhat enlarged to receive a compression spring 54. The spring bears against a shoulder 56 in the die holding wedge 30 and a flat 58 shoulder formed in the bottom section of the body.

The interfacing surfaces 40 and 42 of the die 30 and wedge 32, respectively, are formed with a locking device generally shown by the numeral 60 comprising a detent 60a and a recess 60b which extend from the top surface in a nonhorizontal direction toward the bottom as shown in FIGS. 5 and 6, respectively. The detent 60a and the recess 60b are in the preferred embodiment V-shaped in cross section so that they lock together quickly, easily, and effectively. The locking device is riented at an angle to the horizontal defined by the horizontal bottom surface of the cavity 28. While the locking device 60 may be otherwise oriented, it is preferred that it be at an acute angle to both the horizontal and vertical axes. The locking device 60 may extend from top to as shown in FIG. 6 or side to side as shown in FIGS. 7a and 7b. The cross section of the recess and detent may also be varied as shown in FIGS. 8a–8f which show triangular, rectangular, half-round and mixed cross sections.

The number of recesses and detents in each face is not critical provided, of course, that the number and arrangement on each of the abutting faces conform to each other. It is critical, however, that the recesses and detents are always disposed nonhorizontally with respect to the bottom and sides of the body member, thus insuring elimination of back-and-forth and sideways movements of the wedge and die in the cavity when the die assembly is in use.

The jig assembly of this invention is advantageous since it can be made from readily available materials; thus, having a fewer number of parts than those previously known is cheaper to manufacture. In addition, the die can be easily and quickly changed in use due to the simplicity of the structure of the die assembly of the invention. Still further, the die asembly of this invention provides security not only against vertical movement of the die during use but also against back-and-forth and sideways movements, such not being possible with previously known jig asemblies.

It is understood from the introduction hereto that generally a pair of jigs are employed for right- and left-handed dies. It will be apparent that the other-handed jig conforming to the present invention can be made by exchanging the walls 24 and 26 and the inclinded ramp and wedges, etc.

Numerous other embodiments, changes, and modifications of this invention will be apparent to those skilled in the art. Thus, the invention is not to be limited to the disclosed embodiments thereof except as defined in the appended claims.

What is claimed is:

1. A jig assembly for a screw cutting die comprising a body having front and rear faces and peripheral side walls, a top wall of said body being provided with a cavity defined by a pair of spaced inner walls, one of said inner walls having a flat surface extending perpendicular to the front and rear faces, the other of said inner walls having an inclined surface extending at an angle inwardly from the top wall; a die having a front and a rear face and peripheral walls, one of said peripheral walls being formed with a die head, said die head facing and extending horizontally outward from said front face of said body, a solitary die locking wedge vertically disposed in said cavity, said wedge having a flat perpendicular rear face and front face inclined at an angle conforming to that of said other inner wall, said die and die locking wedge being arranged within said cavity so that the rear face of said die abuts the perpendicular wall of said cavity and the rear face of said die locking wedge abuts the front face of said die and the inclined face of said die locking wedge abuts the inclined surface of said inner wall of said cavity; and screw means extending vertically through said wedge and into said body to clamp said wedge tightly to said die and secure said die in said cavity.

2. The jig assembly according to claim 1 including a mating nonhorizontally extending detent and recess on the rear face of said wedge and on the front face of said die, said detent and recess acting to secure said die and said wedge against each other and against back-and-forth and sideways movements with respect to each other and said die supporting body member.

3. The jig assembly according to claim 2 wherein supporting body and said die wedge are provided with vertically aligned bores and the screw means is provided with a compression spring disposed in said vertical bores securing said wedge and said cavity against each other and against vertical movement with respect to said body.

4. The jig assembly according to claim 2 wherein the wedge is provided with a plurality of detents and the die is provided with a plurality of matching recesses.

5. An improved die assembly comprising a die supporting body member, a cavity in said body member defined by a bottom surface and a pair of spaced upwardly extending inner walls a first vertical bore extending into said body member with one end of said bore terminating at said bottom surface of said cavity, a die horizontally disposed in said cavity and a singular, vertically oriented die wedge configured to conform to the shape of said cavity and disposed therein, said die wedge provided with a second vertical bore extending therethrough which is in alignment with the first vertical bore of said body member, screw means provided with a compression spring disposed in said first and second vertical bores for securing said die wedge and said die in said cavity against each other and against vertical movement with respect to said die supporting body member, and said die wedge or said die having, within said cavity defined by said bottom surface and said inner walls in said body member, at least one non-horizontally extending detent or recess on a surface thereon in contact and mating with a corresponding detent or recess on a surface of the adjacent die wedge or die for securing said wedge and said die against each other and against back-and-forth and sideways movements with respect to each other and said die supporting body member.

6. An improved die assembly according to claim 5 wherein the die wedge or the die is provided with a plurality of detents or recesses.

7. An improved die assembly according to claim 6 wherein the die wedge is provided with a plurality of detents and the die is provided with a plurality of matching recesses.

8. An improved die assembly according to claim 6 wherein the die wedge is provided with a plurality of recesses and the die is provided with a plurality of matching detents.

9. An improved die assembly according to claim 6 including a shim plate located on the die supporting body member in the vicinity of the die wedge.

* * * * *